July 24, 1923.
M. W. BARWALD
1,462,501
PISTON
Filed May 8, 1922
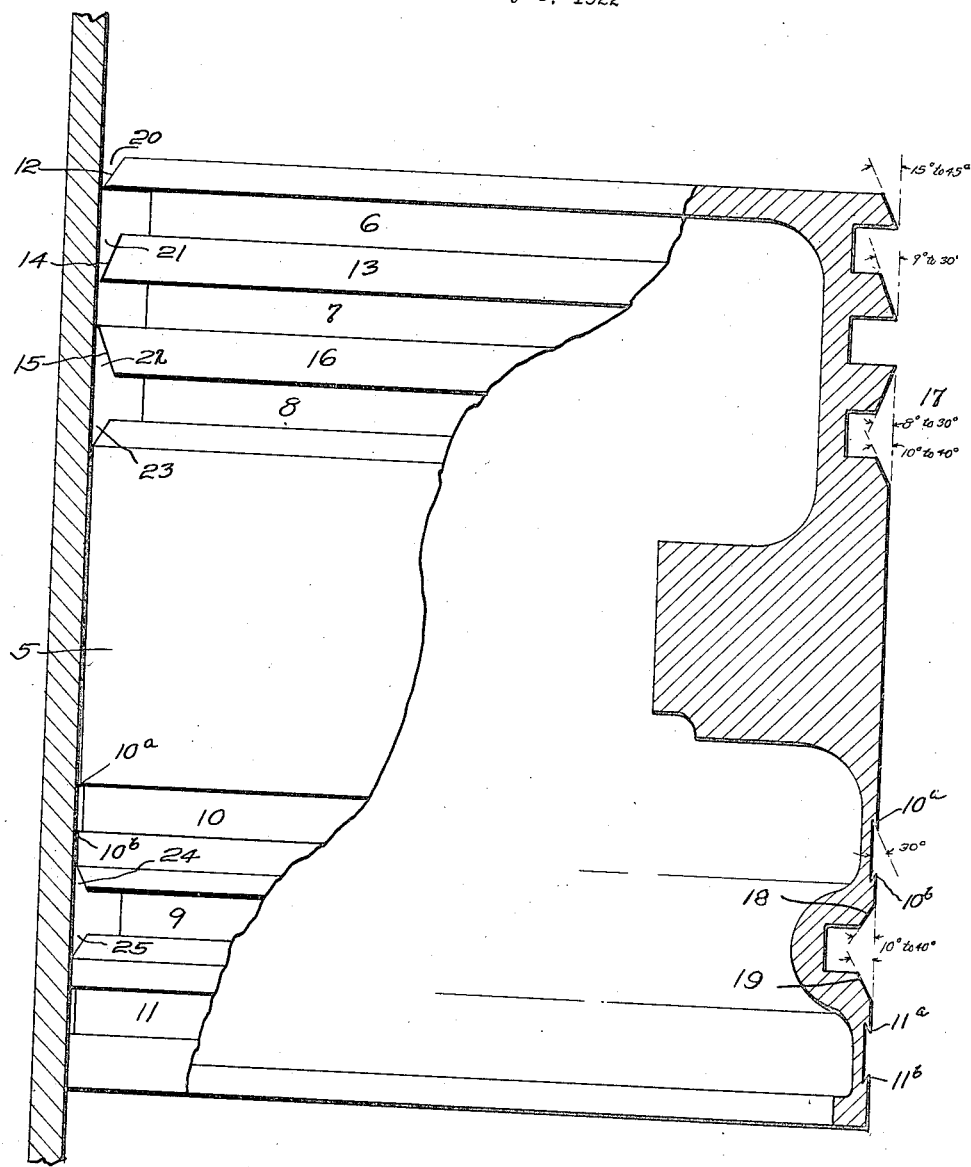
Inventor
M. W. Barwald
By Shepherd & Campbell
Attorney Patented July 24, 1923.

1,462,501

UNITED STATES PATENT OFFICE.

MONT W. BARWALD, OF JACKSONVILLE, FLORIDA.

PISTON.

Application filed May 8, 1922. Serial No. 559,296.

*To all whom it may concern:*

Be it known that I, MONT W. BARWALD, a citizen of the United States, residing at Jacksonville, in the county of Duval and State of Florida, have invented certain new and useful Improvements in Pistons, of which the following is a specification, reference being had therein to the accompanying drawings.

This invention relates to pistons and more particularly to pistons for internal combustion engines and it has for its object to provide an improved device of this character constructed in such manner as to facilitate the lubrication of the cylinder walls to prevent the gases of combustion and compression from finding their way past the piston into the engine crank case; to prevent oil from finding its way from the crank case past the piston into the combustion chamber and to cause the lubricating oil to act in a way to form a guiding and cushioning means for the piston in such manner as to eliminate piston slap.

The figure shown in the accompanying drawing is a view partly in side elevation and partly in section of a piston constructed in accordance with the invention.

In the drawing 5 designates the body of the piston which is grooved at its upper part as indicated at 6, 7 and 8 and at its lower part as indicated at 9 in the usual way for the reception of piston rings of any desired construction. The piston is additionally cut at 10 and 11 above and below the groove 9 in such manner as to form very shallow recesses having the undercut, upper and lower edges 10ª, 10ᵇ and 11ª, 11ᵇ, respectively. The edge of that portion of the cylinder above the groove 6 is beveled at an angle of from 15 to 45 degrees, as indicated at 12. The edge of the rib 13 which lies between the grooves 6 and 7 is beveled, as indicated at 14 at an angle of from 9 to 30 degrees. The peripheral face 15 of the rib 16 which lies between the grooves 7 and 8 is beveled, as indicated at 17 at an angle of from 8 to 30 degrees, while the periphery of the piston adjacent the lower side of the groove 8 is beveled at an angle of from 10 to 40 degrees. The peripheral surfaces of the piston above and below the groove 9 are beveled at angles of from 10 to 40 degrees, indicated at 18 and 19.

Thus it will be seen that a series of pockets will be formed between the peripheral portions of the piston and the cylinder walls, said pockets being designated 21, 22, 23, 24 and 25. The oil which collects in these pockets during the movement of the piston serves to keep the piston wall well lubricated and at the same time forms a seal to prevent the escape of the charge being compressed or the gases of combustion from finding their way past the piston. Furthermore this construction prevents the oil from passing upwardly into the combustion chamber. This is due not only to the fact that the pockets provide a space in which the excess oil is collected but is also due to the fact that during some strokes of the piston the pressure of the compressed charge or the pressure of the working charge as the case may be, is on the oil in the pockets which face upwardly and the greater the pressure in the combustion chamber the tighter the seal effected by this oil. On the suction stroke of the piston (the stroke which is usually responsible for the drawing of oil into the combustion chamber past poorly fitting pistons and piston rings) the oil in the downwardly facing pockets acts in the same way as a seal preventing air or gases from the crank case being drawn into the combustion chamber to satisfy the vacuum created therein by the down stroke of the piston and thus, in turn, prevents any oil being drawn into the combustion chamber.

During the down stroke of the piston, on the suction stroke thereof, the oil contained in the uppermost upwardly facing pockets will be distributed over the cylinder wall effectively lubricating the same.

It will be observed that the grooves 10 and 11 are very shallow grooves. This, coupled with the fact that the upper and lower edges of these grooves are undercut results in the collection therein of what is, in effect, a band or ring of oil which is so bound in the comparatively restricted spaces formed by the grooves 10 and 11 as to guide and hold the piston against lateral movement during its travel, these bands or rings of oil not only lubricating the cylinder wall but preventing any piston slap. Indeed these bands or rings of oil constitute cushioning guides for the lower part of the piston. In order to secure this result it is essential that the grooves 10 and 11 be very shallow. It is manifest that deep grooves would not serve the purpose because there would not be enough oil to fill them. In order to secure the desired results these grooves must be so shallow that they may be substantially completely filled with oil.

It is to be understood that the invention is not limited to the precise construction set forth but that it includes within its purview whatever changes fairly come within either the terms or the spirit of the appended claims.

Having described my invention what I claim is:

1. A piston having a plurality of ring receiving grooves and having the portions thereof adjacent said grooves beveled to form both upwardly and downwardly facing pockets which lie laterally of the piston and above and below the piston rings, the said pockets collecting bodies of oil, the oil in the upper pockets being under pressure of the working charge on the firing stroke of the piston and the oil in the lower pockets being under atmospheric pressure from the crank case on the suction stroke.

2. A piston provided adjacent its lower portion with a wide and shallow peripheral groove of uniform depth throughout its width adapted to be completely filled with oil and of such width that the oil will be trapped therein and act to guide the piston and prevent piston slap.

3. A structure as recited in claim 2 wherein said groove is provided with undercut upper and lower edges.

4. A piston having three ring receiving grooves in its upper portion that portion of the piston above the uppermost groove being beveled from the bottom upwardly and that portion of the piston immediately below the uppermost groove being beveled from the bottom upwardly and that portion of the piston immediately below the second groove being beveled downwardly.

5. A piston having three ring receiving grooves in its upper portion that portion of the piston above the uppermost groove being beveled from the bottom upwardly and that portion of the piston immediately below the uppermost groove being beveled from the bottom upwardly and that portion of the piston immediately below the second groove being beveled downwardly and that portion of the piston below the lowermost groove and at the lower side of said groove being beveled upwardly.

6. A piston having three ring receiving grooves in its upper portion the peripheral portion of that part of the piston which lies above the uppermost groove being beveled at an angle of from 15 to 45 degrees and the peripheral portion of the piston immediately below the uppermost groove being beveled at an angle of from 9 to 30 degrees and the peripheral portion of the section immediately below the second groove being beveled at an angle of from 8 to 30 degrees and the peripheral portion of the portion immediately below the lowermost of said grooves being beveled at an angle of from 10 to 40 degrees.

7. A structure as recited in claim 6 in combination with an additional ring receiving groove adjacent the bottom of the piston, said piston being beveled in opposite directions above and below the last named ring receiving groove at angles of from 10 to 40 degrees.

In testimony whereof I hereunto affix my signature.

MONT W. BARWALD.